US010228860B2

(12) United States Patent
Brue et al.

(10) Patent No.: US 10,228,860 B2
(45) Date of Patent: Mar. 12, 2019

(54) STORAGE OPTIMIZATION BASED I/O PATTERN MODELING

(71) Applicant: Open Drives LLC, Culver City, CA (US)

(72) Inventors: Jeff Brue, Culver City, CA (US); Chad Knowles, Beverly Hills, CA (US); Michael Wilsker, Culver City, CA (US)

(73) Assignee: OPEN DRIVES LLC, Culver City, CA (US)

( * ) Notice: Subject to any disclaimer, the term of this patent is extended or adjusted under 35 U.S.C. 154(b) by 0 days.

(21) Appl. No.: 15/350,394

(22) Filed: Nov. 14, 2016

(65) Prior Publication Data

US 2018/0136839 A1  May 17, 2018

(51) Int. Cl.
*G06F 3/06* (2006.01)

(52) U.S. Cl.
CPC .............. *G06F 3/061* (2013.01); *G06F 3/064* (2013.01); *G06F 3/0683* (2013.01); *G06F 3/0653* (2013.01)

(58) Field of Classification Search
None
See application file for complete search history.

(56) References Cited

U.S. PATENT DOCUMENTS

| | | | | |
|---|---|---|---|---|
| 6,564,304 | B1 * | 5/2003 | Van Hook | G06F 13/1626 345/535 |
| 10,049,335 | B1 * | 8/2018 | Narkier et al. | G06Q 10/0637 705/7.36 |
| 2006/0074970 | A1 * | 4/2006 | Narayanan | G06F 11/3419 |
| 2008/0262824 | A1 * | 10/2008 | Oslake | G06F 8/20 703/22 |
| 2013/0219116 | A1 * | 8/2013 | Wang et al. | G06F 3/068 711/112 |
| 2015/0032967 | A1 * | 1/2015 | Udayashankar | G06F 12/0862 711/137 |
| 2015/0088940 | A1 * | 3/2015 | Stokely | G06F 17/30194 707/827 |
| 2015/0312124 | A1 * | 10/2015 | Curtin | H04L 43/0876 709/224 |

(Continued)

OTHER PUBLICATIONS

Tretyakov (Tretyakov, K., Laur, S., Smant, G., Vilo, J., & Prins, P. (2013). Fast probabilistic file fingerprinting for big data. BMC genomics, 14(2), S8.) (Year: 2013).*

*Primary Examiner* — Saif A Alhija
*Assistant Examiner* — Bijan Mapar
(74) *Attorney, Agent, or Firm* — Ansari Katiraei LLP; Arman Katiraei; Sadiq Ansari

(57) ABSTRACT

Provided are methods and systems for optimizing storage performance on a particular user system based on modeling of the input/output (I/O) primarily encountered by the particular user system. An I/O pattern representative of the primary usage scenario on the user system is obtained and then modeled. The modeling identifies the storage operations involved in the primary storage usage scenario I/O and adjusts values for one or more configurable settings of the storage operations. The adjusted values modify the behavior of the storage operations for prioritized reading, writing, and caching of the primary storage usage scenario I/O over reading, writing, and caching of I/O unrelated to the primary storage usage scenario.

20 Claims, 10 Drawing Sheets

(56) References Cited

U.S. PATENT DOCUMENTS

2016/0117254 A1* 4/2016 Susarla ............... G06F 12/0862
711/119
2016/0378545 A1* 12/2016 Ho ........................... G06F 9/50
718/107

* cited by examiner $$710 = \begin{pmatrix} V_t & X_c & Y_t & Z \\ V_t & X_c & Y_t & Z \\ V_t & X_c & Y_t & Z \\ V_t & X_c & Y_t & Z \\ V_t & X_c & Y_t & Z \\ V_t & X_c & Y_t & Z \\ & \circ & & \circ \end{pmatrix}$$

$V_t$ = Performance altering variable over time
$w$ = correlative performance affecting variable
$x$ = CurrentValue
$Y_t$ = Next to be assigned variable
$z = \otimes * w$

720

$$A = \begin{pmatrix} P_t & P_{ip} & P_{cp} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{cp} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ & & \circ & & & \circ \end{pmatrix}$$

$$B = \begin{pmatrix} P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ & & \circ & & & \circ \end{pmatrix}$$

$$C = \begin{pmatrix} P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ & & \circ & & & \circ \end{pmatrix}$$

$$D = \begin{pmatrix} P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ P_t & P_{ip} & P_{op} & P_{off} & P_b & P_{fn} \\ & & \circ & & & \circ \end{pmatrix}$$

Pr [ odmin(A) = odmin(B) = odmin(C) ] = J (A, B, C, D, ...)

where "odmin" is a customized hash function based on minhash and J defines a correlative similarity ratio that is used as the basis if a variable change has an increased system function Correlative Function – if J1 > J2 then (Y + f) else (Y – f)

FIG. 7

STORAGE OPTIMIZATION BASED I/O PATTERN MODELING

BACKGROUND ART

Processor, network bandwidth, and memory performance have rapidly increased over the years. Storage however remains a bottleneck.

Magnetic storage has scaled in size with hard drives now offering terabytes worth of storage. Cost has also been reduced in terms price per megabyte of storage. However, performance improvements for this type of storage have only been incremental relative to performance improvements made to other hardware components of a computer system.

Solid state storage narrows the storage performance gap relative to the other hardware components by providing improved performance over magnetic storage. The tradeoff, however, is the price per megabyte of solid state storage is significantly higher relative to magnetic storage. Also, solid state storage capacities are magnitudes smaller than magnetic storage capacity.

In view of these tradeoffs, magnetic storage remains in wide spread usage and remains a primary option for storing large sized files. In fact, the transition to higher definition video content and more feature rich content enabled by the greater processing power and network bandwidth has ensured that magnetic storage will not be replaced by solid state storage or other storage options for some time. Game, application, and video content creators have little option but to continue using magnetic storage because of their larger storage capacities and lower cost of operation even if performance is not optimal.

Different storage mediums can be combined within a single computer system to leverage their different advantages and thereby improve overall storage performance. In a typical combined usage scenario, smaller but faster storage is used as a caching layer for larger but slower storage. The caching layer attempts to keep the most important (e.g., most frequently requested or most recently used) content in the faster storage medium so that it can be accessed more efficiently.

A file system controls when and how files are written to and read from the one or more computer system storage mediums. This allows the file system to also control how content is cached across the different storage mediums. Accordingly, the file system has a large affect on storage performance.

File systems rarely realize the full input/output (I/O) performance of the different storage mediums under their control. This is in large part due to the file system being optimized for general application. File systems attempt to provide the best performance for all possible storage usage scenarios. In other words, current file systems attempt to provide constant performance for storage (i.e., reading and writing) of small file sized content and large sized content, for storage of large sequential blocks as well as bursts of random blocks, and for storage of cached and uncached content as some examples. For these reasons, current file systems do not provide optimal performance for any particular usage scenario. As a result, hard drives are rarely used at their full performance capabilities. This in turn degrades overall computer system performance.

There is therefore a need to improve file system performance and, in so doing, improve storage performance within a computer system. There is a need to shift away from the paradigm of optimizing for the lowest common denominator or for providing balanced storage performance for all usage scenarios. Instead, there is a need to optimize storage performance for the primary usage scenario of the computer system, even if, such optimizations degrade performance for less common storage operations on the particular computer system. Thus, there is a need to improve how, where, and when data is written to and read from one or more different computer system storage mediums as well as how data is cached across the different storage mediums. To this end, there is a need to optimize the file system and hard drive usage in relation the real world storage of data on a computer system.

BRIEF DESCRIPTION OF THE DRAWINGS

A preferred embodiment of methods and systems for optimizing storage and file system operation based input/output pattern modeling will now be described, by way of example only, with reference to the accompanying drawings in which:

FIG. 7 provides an exemplary model for optimizing storage performance on a particular usage system in accordance with some embodiments.

DETAILED DESCRIPTION

I. Overview

The embodiments provide methods and systems for optimizing storage performance on a particular user system based on modeling of the input/output (I/O) primarily encountered by the particular user system. The modeling identifies primary storage usage scenarios on the particular user system. The primary usage scenarios identify, for example, read to write operation proportionality, sequential to burst proportionality, cache hit ratios, file sizes involved in I/O operations, file or block access patterns, and metadata versus application data accesses. Some embodiments then modify the manner with which the system reads, writes, and caches data to one or more storage mediums of the particular user system based on the modeled I/O. In particular, the modifications customize and optimize the performance of different storage operations performed by the particular user system for the identified primary storage usage scenarios. Modifying the storage operations may involve reprioritizing read or write operations directed to different content types, reprioritizing read operations in relation to write operations and vice versa, optimizing content types entered and purged from one or more caches, and reading ahead for prepopulating a cache or for prefetching in advance of read requests as some examples. More generally, modifying the storage operations involves reordering I/O execution for more efficient storage performance. In some embodiments, the storage operation modifications comprise changing operational configurations and execution behavior of at least one of the user system operating system (OS), kernel, file system, or individual storage medium controllers or firmware.

Figure 1:
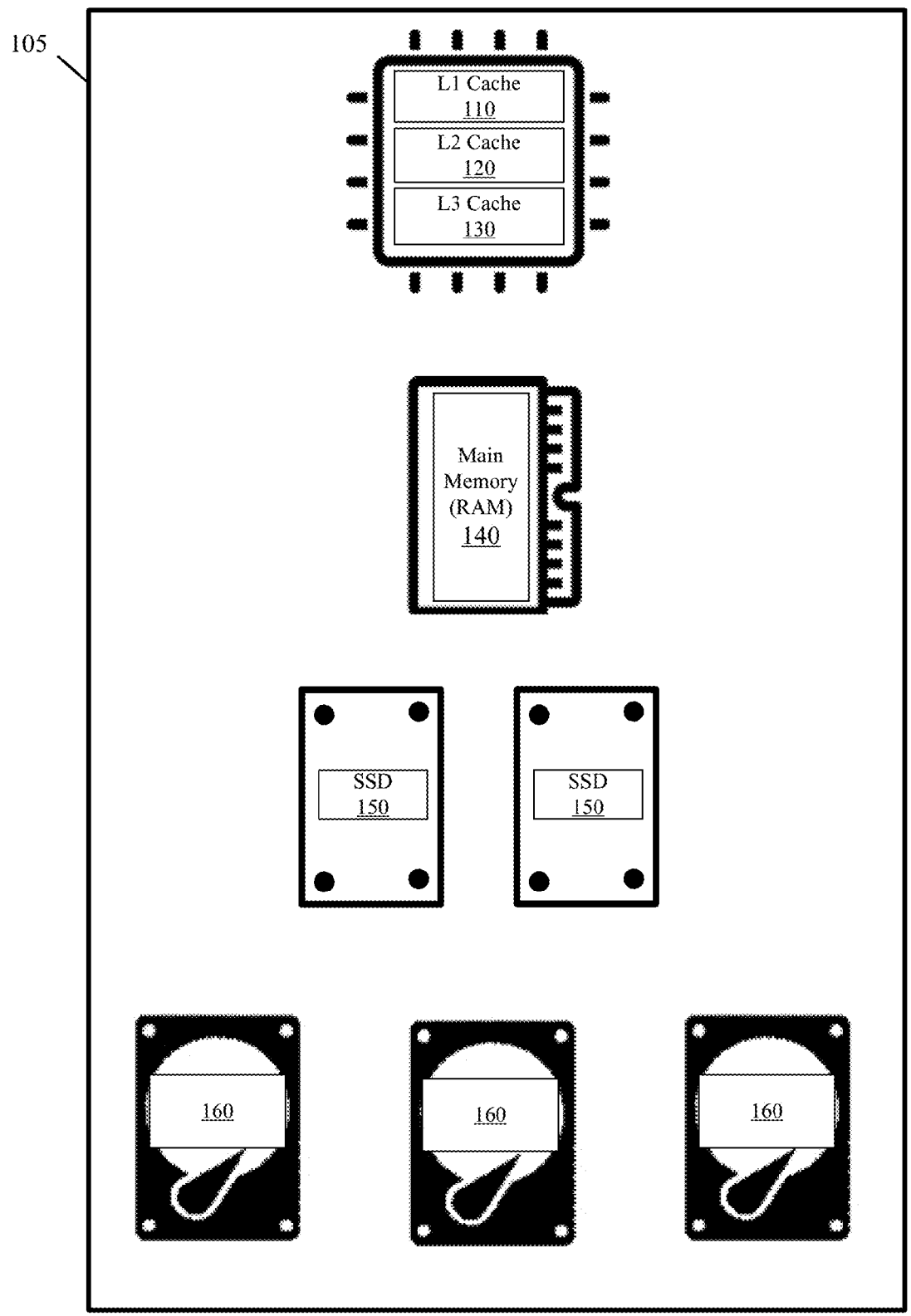
FIG. 1 conceptually illustrates a standalone system in accordance with some embodiments.

The embodiments and resulting optimizations can be implemented on a standalone machine that users directly interface with. FIG. 1 conceptually illustrates a standalone system 105 in accordance with some embodiments. The system 105 includes different storage mediums 110-160. As shown, the storage mediums include, but are not limited to, different processor caching layers 110, 120, and 130, main memory or random access memory (RAM) 140, solid state drives 150, and magnetic drives 160.

Each storage medium 110-160 has a different storage capacity and different storage performance. The storage performance is based on how fast the storage medium reads and writes different types of data under different access patterns.

User system 105 software (not shown) controls storage across these storage mediums 110-160. In particular, the user system 105 software controls the distribution of I/O across the storage mediums. By controlling this distribution, the user system 105 software can hierarchically configure the storage mediums 110-160 to leverage smaller but faster storage mediums as different caching layers. The user system 105 software controlling the I/O distribution is a result of concerted operation between the OS, kernel, file system, and storage medium drivers and firmware.

The I/O is generated from application software executing on the user system 105. For instance, a video editing application executing on the user system 105 would likely issue a request to open a video file to the user system 105. This request would result in a series of reads to the various storage mediums 110-160 where different blocks of the video file are stored.

Figure 2:
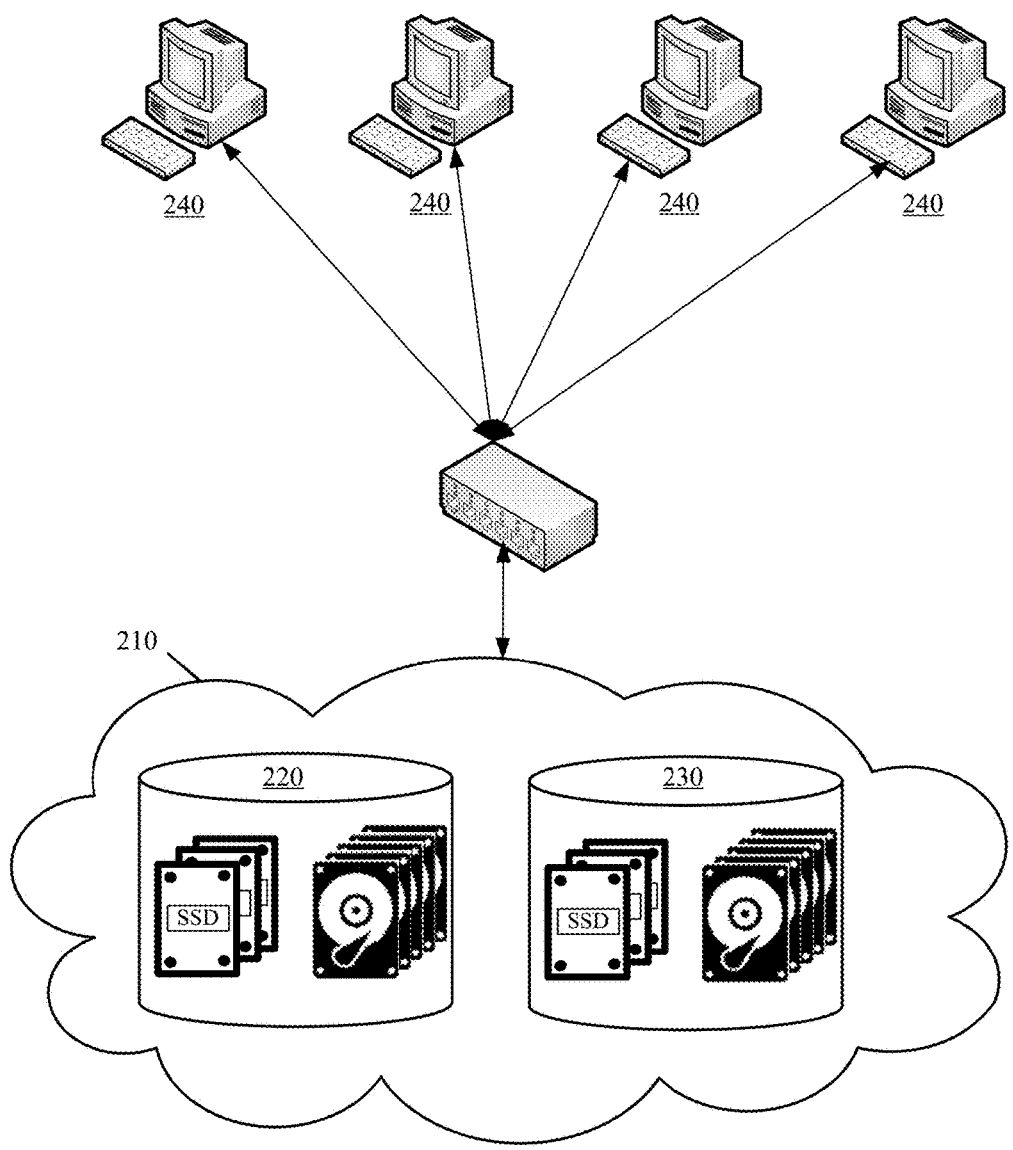
FIG. 2 conceptually illustrates a remote storage cluster with a distributed set of storage servers providing network storage for a set of user systems.

The embodiments and resulting optimizations can also be implemented on a remote storage cluster that one or more user systems remotely access for storage. FIG. 2 conceptually illustrates a remote storage cluster 210. The remote storage cluster 210 is formed using a distributed set of storage servers 220 and 230 providing network storage for a set of user systems 240. The remote storage cluster 210 can be a network attach storage (NAS), storage area network (SAN), or cloud based set of servers that the user systems 240 access over a network. Networking protocols including the Network File System (NFS), Server Message Block (SMB), Common Internet File System (CIFS), Internet Wide Area Remote Direct Memory Access (RDMA) Protocol or iWARP, RDMA over Converged Ethernet (RoCE), Internet Small Computers Interface (ISCSI), and Apple Filing Protocol (AFP) can be used to facilitate the exchange of data from the remote storage cluster 210 to the user systems 240 as well as to provide read and write instructions from the different user systems 240 to the remote storage cluster 210. Here again, the modifications can be made to any of the operating system, kernel, file system, or individual storage medium controllers or firmware of the individual storage servers 220 and 230 within the remote storage cluster 210. The modifications can also be made to the networking protocols with which storage operations are communicated to the remote storage cluster 210.

A primary advantage and differentiator over the prior art is that the storage optimizations provided by the embodiments herein are customized and specific to the primary storage usage scenario on an individual user system. In other words, different optimizations are made to improve the storage performance of different user systems with different I/O patterns. In doing so, the embodiments change user system storage operations from providing balanced storage performance for all I/O to providing optimized storage performance for a particular subset of the I/O relating to the primary storage usage scenario of the user system, and providing controlling capability to define the allocation of I/O resources based on the state of a user application.

Figure 3:
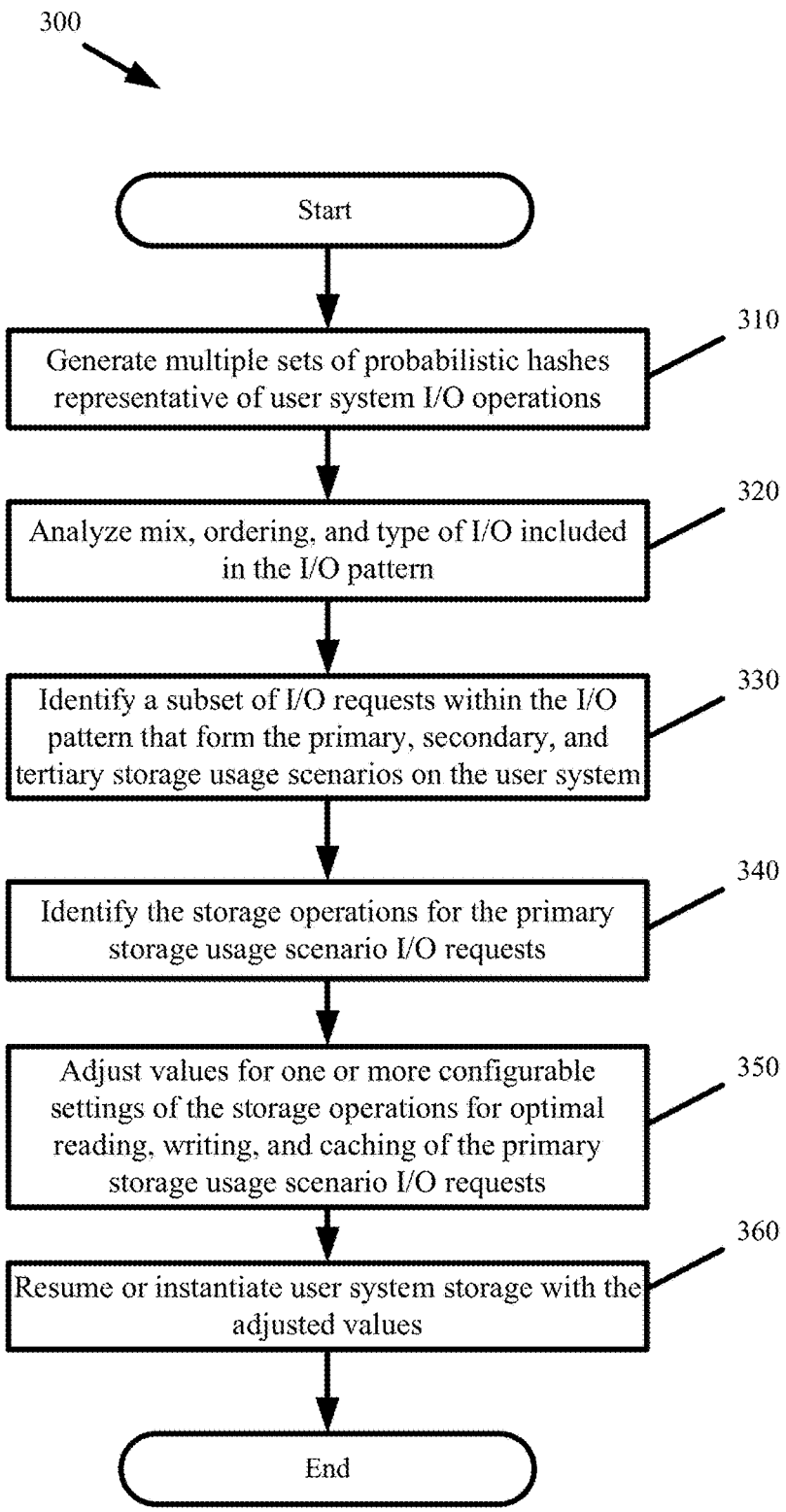
FIG. 3 presents an overview process for optimizing storage performance on an individual user system according to a primary storage usage scenario of that particular user system in accordance with some embodiments.

FIG. 3 presents an overview process 300 for optimizing storage performance on an individual user system according to a primary storage usage scenario of that particular user system in accordance with some embodiments. In some embodiments, process 300 is an automated process that runs on the user system or that runs on a separate optimization machine that can remotely configure the user system.

The process 300 commences by generating (at 310) multiple sets of probabilistic hashes that are representative of the I/O operations issuing on the user system where storage performance is to optimized. The I/O operations can also be obtained from recording or mirroring storage accesses on the user system for some period of time. The I/O operations include a sequence of read and write storage requests, their size and latency, issued by the applications executing on the user machine or leveraging the user system for various storage operations. The I/O operations can also include network operations when performing storage across a remote storage cluster.

From the I/O operations, the process models the user system I/O pattern over time. The modeling analyzes (at 320) the mix, ordering, and type of I/O operations included in the I/O pattern in order to identify (at 330) different subsets of I/O operations within the I/O pattern that represent the primary, secondary, and tertiary storage usage scenarios of the user system. As part of the modeling, the process further identifies (at 340) the storage and network operations involved in any of the reading, writing, or caching of the primary storage usage scenario I/O and adjusts (at 350) values for one or more configurable settings of the storage operations. In adjusting the values for the configurable settings, the process modifies the behavior of the storage operations for optimal reading, writing, and caching of the primary, then secondary, then tertiary storage usage scenario I/O. In some embodiments, the adjusted values provide execution or storage priority to read, write, or cache requests for the primary storage usage scenario I/O over read, write, or cache requests for I/O unrelated to the primary storage usage scenario (i.e., the secondary and tertiary storage usage scenarios).

In this manner, the embodiments are able to improve storage performance and overall user system performance without adding additional hardware resources to the user system. The process then resumes (at 360) or instantiates the user system storage with the adjusted values and with I/O issued from real-world usage of the user system.

II. I/O Pattern

The primary storage usage scenario stems from how the user system is primarily used. In professional and business settings, user systems are often dedicated for very specific tasks. For example, some user systems are primarily used and effectively dedicated to perform one or more of the storage intensive tasks of video rendering, data analytics, genomics, editing, transcoding, or streaming.

In order to identify the primary storage usage scenario on a user system, some embodiments record or otherwise monitor user workload, and more specifically, the I/O requests resulting from various running applications over time. The recording can involve sampling the workloads or I/O, during targeted intervals, thereby providing a segmented but extended real-time account of the workload on a per connected application or user basis.

To better focus on the primary storage usage scenario, the recording can be restricted to one or more specific applications running on the system, or relying on the system for storage operations. This can include restricting monitoring to certain probabilistic hash patterns creating a basis for whether or not to eject and stop further analysis. By monitoring the workloads and I/O from one or more specific applications, some embodiments are able to customize and optimize the reading, writing, and caching operations of the user system directly for these specific applications.

Alternatively, the recording can apply to all user system interaction or I/O from all applications running on the user system. Here, storage performance is not optimized for any individual application, but rather, for the primary storage usage scenario of the user system as a whole.

Some embodiments introduce a set of probes throughout the system in order to monitor the user workload for some period of time. The probes can be embedded within the network file system, the local machine file system, system network stack, OS, kernel, or within the storage medium controllers or firmware. The probes record or log the I/O operations form the user system I/O pattern at different levels within the user system.

Depending on their insertion points, the probes can provide a multitude of measurements in addition to recording I/O operations. The measurements can be related to storage performance and storage operation execution at the network file, local machine file system, system network stack, and individual storage medium layers. For instance, a first set of probes can track issued or executed I/O operations while a second set of probes track latency and average seek times of the different storage mediums for reads and writes performed in response to the I/O operations.

The I/O monitoring can also be granularly defined. In particular, when performing I/O monitoring, the probes can decipher what types of content are requested, the block structure of read and write requests, patterning of requests, and average request compression ratio. The probes can then selectively track or monitor a specific subset of the I/O directed to the primary usage scenario while ignoring other I/O that could potentially dilute the primary usage scenario or introduce outlying data therein.

Some embodiments perform the I/O tracking by introducing dtrace probes into the kernel and OS of UNIX, SOLARIS, or LINUX based systems. Other probes can be introduced using application programming interfaces (APIs) to the file systems or storage medium controllers and/or drivers. Additional probe structure can be defined at the network stack to define I/O network patterning and to reduce latency. Third party tools can supplement the probing of the user system I/O, storage operations, and storage performance.

After placing the probes in the user system, users interact with the user system for some duration so that the probes can capture the I/O pattern including the different subsets of I/O operations of the primary, secondary, and tertiary storage usage scenarios. The users perform routine tasks they would normally do on the user system and the probes capture the storage related activity that is subsequently used for modeling and implementing the user system optimizations, wherein the storage related activity includes the read and write storage requests issued on the system.

The probes can record the captured or monitored I/O pattern to a log file that can be subsequently used for the modeling that is described in detail below. Different I/O patterns can be generated for user systems with different hardware or storage configurations. Different I/O patterns can also be generated for different primary storage usage scenarios on a user system with a particular hardware or storage configuration.

Several aspects of the probe tracked data feed into the probability hashing. In particular, I/O latency is used to obtain a baseline performance measure of the user system in its default configured state. By probing I/O latency after optimizing the user system for the primary usage scenario and comparing the post-optimization probe result to the pre-optimization probe baseline, the percentage improvement to the storage performance of the user system can be quantified.

Figure 4:
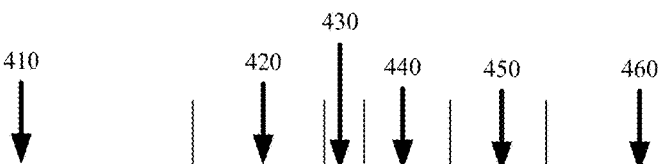
FIG. 4 illustrates I/O pattern tracking performed by a probe in accordance with some embodiments.

FIG. 4 illustrates I/O pattern tracking performed by a probe in accordance with some embodiments. The first column 410 provides a timestamp in microseconds. The difference between the accesses provides the operation latency. The second column 420 provides the client Internet Protocol (IP) address. The third column 430 identifies the I/O operation as either a read or write. The fourth column 440 is the offset in blocks to start the operation. The fifth column 450 provides the size of the file I/O operation. The sixth column 460 provides the file path including the file type.

From the I/O pattern of FIG. 4, the methods and systems of some embodiments identify the primary usage scenario as one with a high percentage of large file write operations. Accordingly, the optimizations could prioritize the writing of large file sizes over small file sizes as well as read operations. For instance, the write buffer of a particular storage medium can be increased in size so that more data can be written at one time in a sequential and continuous manner on disk. Alternatively, the optimizations could prioritize read operations so that the user system is not continually waiting for the write operations to complete.

Some embodiments avoid user system probing by pre-generating or reusing I/O patterns that are representative of the most common primary storage usage scenarios. The I/O patterns can be cataloged to a library or database of common primary storage usage scenarios along with descriptive information about the user system from which each I/O pattern was generated.

Figure 5:
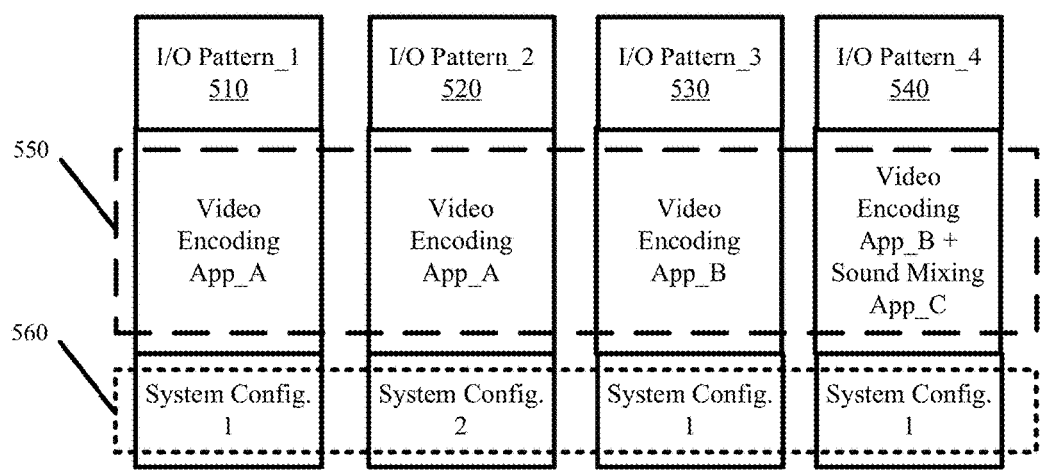
FIG. 5 conceptually illustrates a set of cataloged I/O patterns in accordance with some embodiments.

FIG. 5 conceptually illustrates a set of cataloged I/O patterns 510, 520, 530, and 540 in accordance with some embodiments. Each I/O pattern 510-540 contains I/O operations that were tracked on a user system over a period of time, wherein the I/O operations include, for example, read and write requests that were issued from one or more applications that users interacted with as part of monitoring the users' primary storage usage scenario on that user system.

Each I/O pattern 510-540 is also stored with descriptive information identifying the primary storage usage scenario 550 for the corresponding I/O pattern. The primary storage usage scenario descriptive information can specify one or more primary applications from which the corresponding I/O pattern was generated. The applications can be identified by path names or IP addressing as found in the probed data of FIG. 4.

Each I/O pattern 510-540 is also stored with information about the user system configuration 560 that produced the I/O pattern. The user system configuration can specify hardware components of the user system including the processor, memory, caching layers, and storage mediums that were present on the user system during the recording of the I/O pattern. The user system configuration can further specify the OS, kernel, file system, and driver or firmware versioning.

Once a sufficient number of I/O patterns have been cataloged, new user systems can be optimized without introducing probes into those systems and without monitoring user I/O patterns for some duration in advance of optimizing the system. The user(s) for the new user system can simply identify how they will use the new user system. This can include receiving a list of applications that will be primarily run on the new user system. An I/O pattern modeling a similar usage on a similar hardware and system software configuration is then obtained from the library or database and that I/O pattern is used to optimize the new user system as if the new user system had been previously probed.

For instance, a first I/O pattern may have been obtained from a first entity that primarily uses a first user system with a first hardware and system software configuration for video encoding and a second I/O pattern may have been obtained from a second entity that primarily uses a user system with a second hardware and system software configuration for video editing. When optimizing a new user system for a different third entity that also primarily performs video encoding on hardware and software similar to that of the first user system, the first I/O pattern from the first entity is retrieved and used in optimizing the new user system of the third entity without probing the third entity's user system.

III. Optimization Modeling

The embodiments identify different user system storage optimizations from modeling the I/O patterns of the different primary storage usage scenarios relative to the user system configuration. The user system configuration includes a hardware configuration and system software configuration. The hardware and system software configurations provide the variables for optimizing storage performance. In particular, the hardware and system software configurations include configurable settings. Adjusting the values for these configuration settings alters how the hardware and system software performs various storage operations for reading, writing, and caching data to the different storage mediums of the user system. The modeling determines an optimal set of configurable setting values for customizing and optimizing the user system storage operations relative to the primary storage usage scenario I/O pattern. Stated differently, the modeling determines an optimal set of configurable setting values that provides the best storage performance for the primary storage usage scenario I/O.

Figure 6:
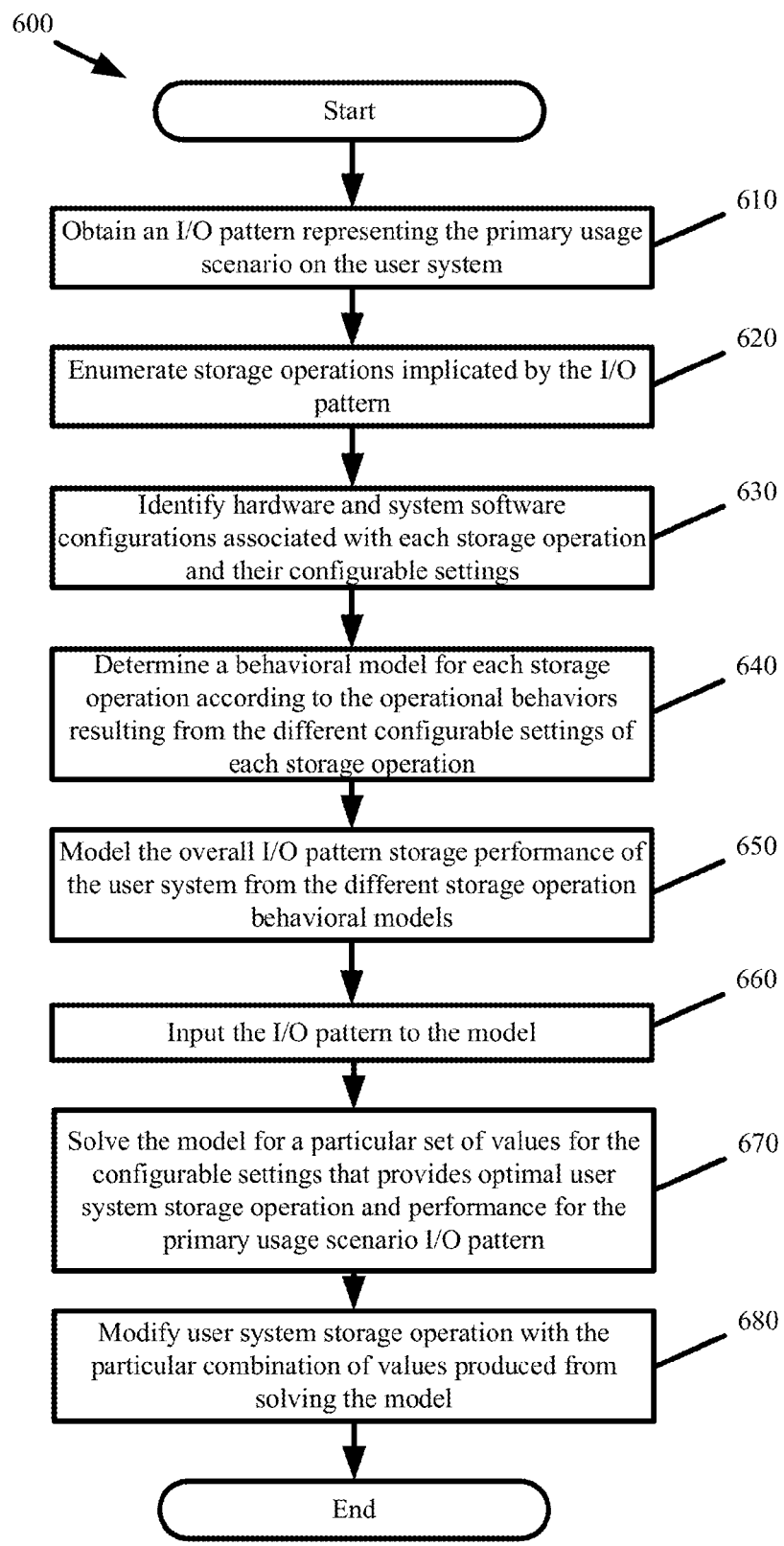
FIG. 6 presents a process for optimizing storage operations from modeling of a primary storage usage scenario I/O pattern in accordance with some embodiments.

FIG. 6 presents a process 600 for optimizing storage operations from modeling of a primary storage usage scenario I/O pattern in accordance with some embodiments. The process 600 commences by obtaining (at 610) an I/O pattern that is representative of the primary storage usage scenario of the user system that is to be optimized.

Next, the process enumerates (at 620) the storage operations implicated by the I/O pattern and identifies (at 630) the hardware and system software configurations associated with each implicated storage operation as well as the configurable settings controlling operational behavior of the configurations or storage operations. For example, a single read operation may involve a sequence of operating and file system operations, different firmware, controller, or driver instructions, and a file of a particular size and particular type at a specific location on one or more different storage layers in a particular order.

The process determines (at 640) a behavioral model for each storage operation according to the operational behaviors resulting from the different configurable settings of each storage operation. The behavioral model for a given storage operation quantifies the efficiency with which a particular storage operation executes a given I/O instruction when configured with each of the different configurable setting values. For example, a write buffer behavioral model can identify different latencies resulting from writing data of a first size to a particular storage medium with the write buffer set to any of a plurality of different sizes. More specifically, the write buffer behavioral model can output latencies of 4 milliseconds (ms), 6 ms, and 10 ms for completing a write operation of a particular size with a write buffer size set of 128 kilobytes, 512 kilobytes, and 1 megabyte. As another example, an I/O request ordering behavioral model can identify different latencies resulting from a particular storage medium writing a first I/O pattern in which every third operation is a read operation and a second I/O pattern in which every fifth operation is a read operation, wherein the second I/O pattern involves more sequential writes than the first I/O pattern.

The process then models (at 650) the overall I/O pattern storage performance of the user system from the different storage operation behavioral models. In particular, the model combines and accounts for performance from all or the most significant behavioral models implicated by the primary storage usage scenario I/O pattern using the identified hardware and system software configuration values.

The process inputs (at 660) the primary storage usage scenario I/O pattern to the model and solves (at 670) the model. Solving the model produces as output the particular combination of values for the configurable settings of the different behavioral models that provide optimal user system storage operation and performance for the primary usage scenario I/O pattern. Effectively, solving the model simulates how the hardware and system software configurations perform under all possible value combinations for the different configurable settings and the particular I/O pattern of the primary storage usage scenario. The modeling accurately simulates storage performance in software without actually configuring the user system with all possible configurable setting combinations and testing each configurable setting combination against the primary usage scenario I/O pattern. As a simplified example for explanatory purposes, the model computes user system storage performance for the primary usage I/O pattern, if the write buffer of a storage drive is set to W, a cache is configured with size X, storage drive read and write blocks are of size Y, and the file system is configured to prioritize type Z content. Solving the model produces optimal W, X, Y, and Z values. The solution is reached by essentially simulating with the primary usage I/O pattern, the user system storage performance over all possible combinations of W, X, Y, and Z for the software and hardware configuration of the user system until the best performing combination is found. As will be explained below, the model is defined mathematically to simplify solving the model for the optimal set of values optimizing the user system storage performance.

The process continues by modifying (at 680) user system storage operation with the particular combination of values produced from solving the model. In some embodiments, modifying the user system storage operation involves reconfiguring the user system hardware and software system configurations with the particular optimal combination of values produced from solving the model.

The hardware and system software configurable settings directly correlate to configurable settings that modify OS, kernel, network file system, local file system, or individual storage medium operation. In some embodiments, changing the values for the configurable settings involves changing various configuration files referenced by the OS, kernel, or file systems during initialization or runtime. In some embodiments, changing the values for the configurable settings involves embedding the values directly in OS modules, kernel modules, file system modules, or hardware firmware or drivers and recompiling the corresponding module(s) in order to effectuate the modified storage operation behavior. In summary, modifying the user system storage operation involves configuring one or more of the user system OS, kernel, file system, firmware, controller, and drivers with the optimal values derived from solving the model according to the primary usage I/O pattern. In other words, performance and operational behavior of the user system (i.e., the manner with which the user system performs I/O) changes as a result of tuning the parameters controlling the storage operations.

In some embodiments, a Mathematica equation is used for the modeling performed at step 650. The Mathematica equation is solved by a computer processor, thereby automating the simulation and solving of the equation. The equation allows for the model to be solved without testing or simulating the user system with all possible value combinations for the various behavioral models implicated by the primary usage I/O pattern. In other words, the equation allows the model to be solved mathematically. Solving the model then directly provides the optimal value set for the configurable settings of the implicated storage elements and the software and hardware configuration of the user system relative to the primary usage I/O pattern, wherein the implicated storage elements can be any one or more of the OS, kernel, network file system, local file system, drivers, firmware, controllers, etc., and wherein the software and hardware configuration of the user system includes the processors, caching layers, memory, storage mediums, storage buses, etc. of the user system.

The Mathematica equation is defined with the behavioral models for each storage operation. The equation accepts the I/O pattern as input. Here again, solving the equation involves identifying the optimal values for the configurable settings from which the behavioral models produce the best storage performance for the I/O pattern.

FIG. 7 provides an exemplary model for optimizing storage performance on a particular usage system in accordance with some embodiments. The figure model provides a tensor based weighted methodology for tracking dynamic performance effecting variables. The model includes sample matrices for input probes and a basic representation of the correlative hashing function that results in a final determinant. In particular, matrix 710 is a multi-dimensional matrix with rank 4 tensor plots correlating to performance affecting variables. Matrices 720 are sample matrices providing examples of probe data sets.

Some embodiments model and optimize any of over 400 configurable settings for storage operations and the user system software and hardware configuration that affect storage operation on a user system. A sample set of key configurable settings is provided below to illustrate some of the various optimizations that can be made to storage operation at different layers within a user system.

Within the user system, the cache scheduler is part of the system software configuration controlling when and what content is cached at one or more storage mediums. Different configurable settings for the cache scheduler can be used to change the caching at one or more storage mediums between most recently used (MRU) and most frequently used (MFU). Different configurable settings can be used to control the size of the caches and the speed at which they onboard data. In some embodiments, the ZFS file system, for example, the spa_asize_inflation, arc_shrink_shift, and zfetch_max_streams configurable settings can be used to control the amount of kernel memory or main memory that is used for caching and how that caching behaves.

Different configurable settings for the cache scheduler can also be used to prioritize or reserve caching for specific block structure types. For example, the modeling can identify that the primary usage scenario I/O pattern involves a disproportionate amount of metadata requests. In such cases, the ZFS file system primarycache and secondarycache configurable settings can be used to dynamically change the balance between user data and metadata caching in different caching layers or storage mediums of the user system. The disproportionate amount of metadata requests can be identified in an I/O pattern where I/O requests occur non-sequentially. Alternatively, metadata requests or requests for different content types or protocols can be identified from analyzing headers of NFS or SMB requests within an I/O pattern. In such cases, the configurable settings for the cache scheduler can be set to prioritize caching of metadata on one or more storage mediums of the user system, or to optimize the underlying MFU algorithm in order to dynamically adjust to the ongoing usage pattern.

Within the user system, the I/O scheduler is part of the system software configuration controlling when and how I/O read and writes are issued to one or more storage mediums. Different configurable settings for the I/O scheduler can be used to throttle different read or write operations, thereby effectively reordering their execution by prioritizing execution of certain operations over others. The ZFS file system provides the following configurable settings for customizing the I/O throttling: zfs_dirty_data_max, zfs_dirty_data_sync, zfs_delay_max_ns, zfs_delay_min_dirty_percent, zfs_delay_scale, zfs_vdev_max_active, zfs_vdev_sync_read_min_active, zfs_vdev_sync_read_max_active, zfs_vdev_sync_write_min_active, zfs_vdev_sync_write_max_active, zfs_vdev_async_read_min_active, zfs_vdev_async_read_max_active, zfs_vdev_async_write_min_active, zfs_vdev_async_write_max_active, zfs_vdev_scrub_min_active, zfs_vdev_scrub_max_active, zfs_vdev_async_write_active_min_dirty_percent, zfs_vdev_async_write_active_max_dirty_percent The modeling of the I/O pattern from a user system with a primary usage scenario involving the Adobe Premiere application revealed that in line variable optimizations to the I/O throttling configuration settings could greatly improve I/O storage performance of the user system. The I/O pattern included a pattern of random high burst I/O requests followed by random large sequential reads. The random bursts were directed to metadata accesses performed by the application for checking filenames, file date modifications, file versioning, file metadata, etc. The I/O pattern modeling revealed that the metadata accesses did not impact perceived user performance as much as the large sequential reads, because the large sequential reads were necessary for ensuring smooth stream user perceptible playback. Accordingly, the configurable setting optimizations for this I/O pattern partly involved throttling the I/O metadata accesses in favor of the more important sequential reads.

Figure 8:
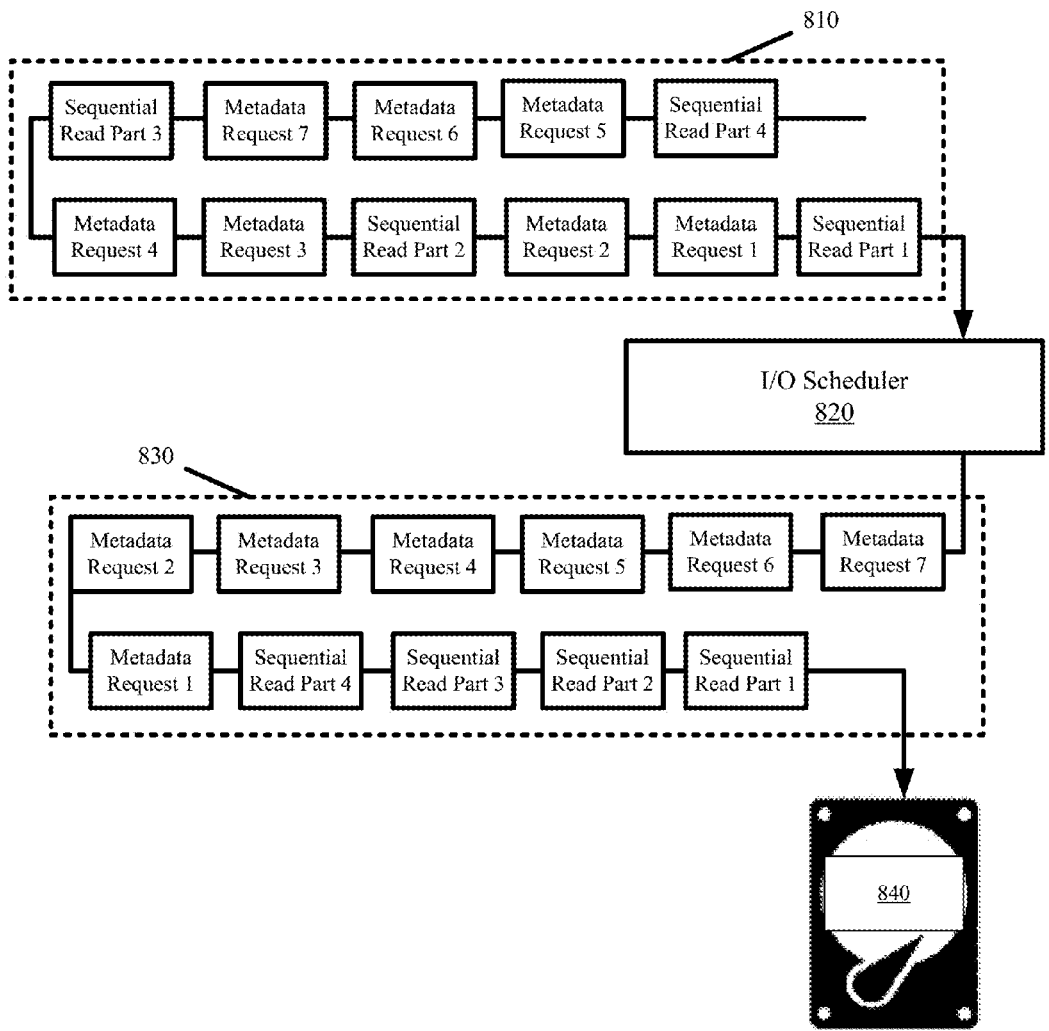
FIG. 8 conceptually illustrates reordering an I/O pattern as a result of I/O throttling performed in response to prior I/O pattern modeling in accordance with some embodiments.

FIG. 8 conceptually illustrates reordering an I/O pattern as a result of I/O throttling performed in response to prior I/O pattern modeling in accordance with some embodiments. The figure illustrates the I/O pattern 810 produced from applications typically run on a particular user system. The figure illustrates the reconfigured I/O scheduler 820 modifying the original I/O pattern 810 to produce an optimized I/O pattern 830 in which the sequential read requests are reordered to be performed before the metadata read requests prior to sending the optimized I/O pattern 830 to a storage medium 840 for execution.

Different configurable settings for the I/O scheduler can be used to prioritize synchronous or asynchronous read or write operations. Synchronous storage operations should be prioritized when the modeling reveals reading or writing of large size content. Asynchronous storage operations should be prioritized when the modeling reveals random I/O requests. In some embodiments, the ZFS file system zfetch_max_streams and zfetch_max_distance configurable settings are modified dynamically to control the device I/O queue depth and thereby optimize the storage operation for synchronous or asynchronous operations.

Different configurable settings for the I/O scheduler can be used to prepopulate and cache certain content in a storage medium before the entire content is requested. The modeling can identify that the primary usage scenario I/O pattern involves a disproportionate amount of sequential reads. Such an I/O pattern can be indicative of large file or content reads. In such cases, the configurable settings for the I/O scheduler can be set to read a certain number of blocks or megabytes upon receiving a request to read a first block or chunk of the content. In some embodiments, the ZFS file system zfetch and vdev_cache configurable settings allows for customization of file-level and device-level prefetching.

Such an I/O pattern is found in a user system that provides storage for many different client applications. The user system can degrade client application performance if it is not able to consistently deliver high throughput to all the client applications. The modeling optimizes storage operation and performance for this user system by modifying the configurable settings to read ahead several megabytes for each received read request. The modeling revealed that extending the read of a block identified in an I/O request to subsequent blocks in the direction of the storage medium or mechanical drive spin was more efficient than waiting for a next block I/O request to issue and the mechanical drive to circle back around to the requested block.

Figure 9:
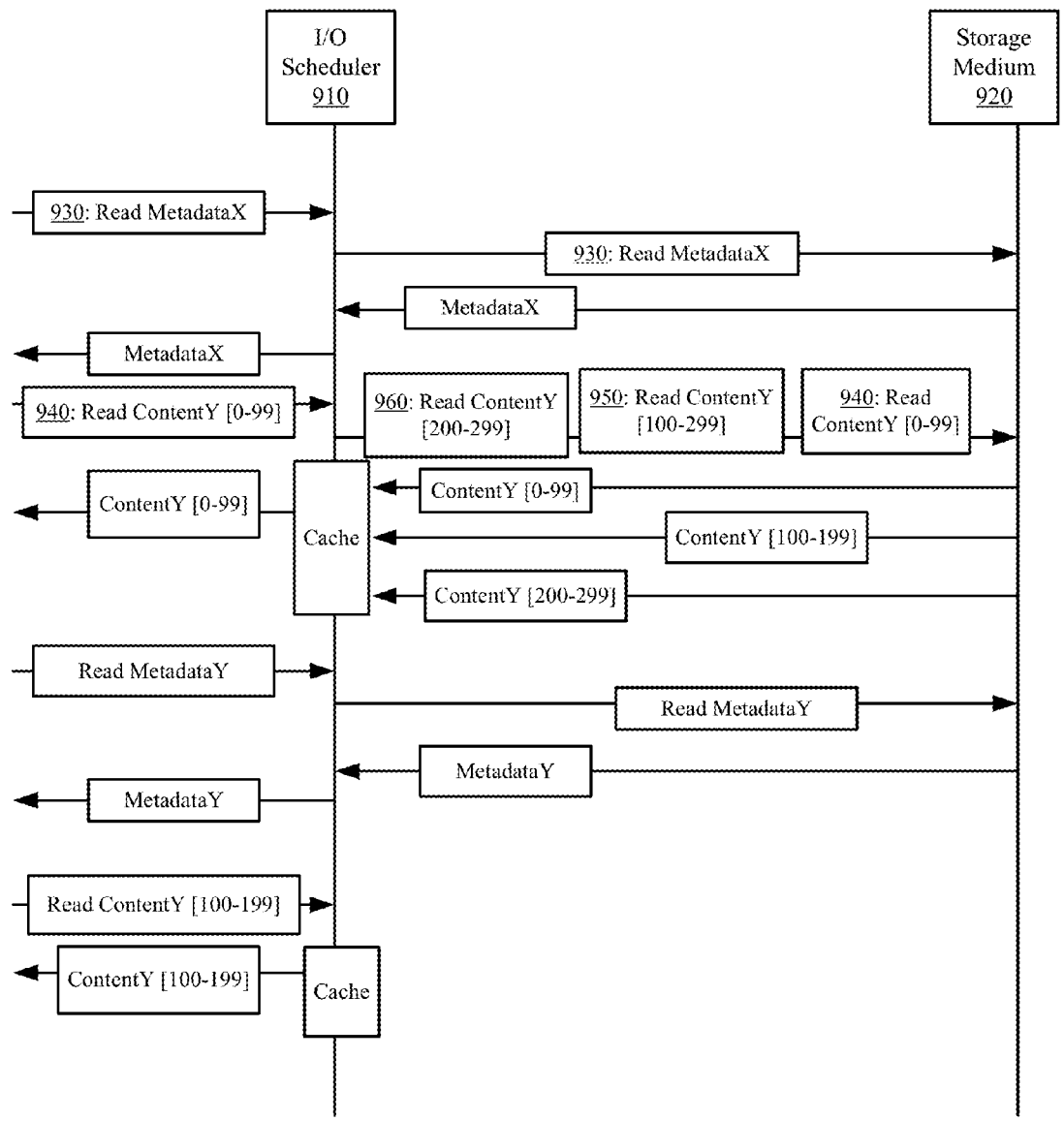
FIG. 9 conceptually optimizing storage operations of a user system for prefetching certain requests within an I/O patterns as a result of prior I/O pattern modeling in accordance with some embodiments.

FIG. 9 conceptually optimizing storage operations of a user system for prefetching certain requests within an I/O pattern as a result of prior I/O pattern modeling in accordance with some embodiments. The figure illustrates the I/O scheduler 910 and a storage medium 920. In this figure, storage operations performed by the I/O scheduler 910 have been optimized to read ahead and cache certain content.

As shown, the I/O scheduler 910 receives a first I/O request 930 for metadata. The I/O scheduler forwards the first I/O request 930 to the storage medium 920 for retrieval of the requested metadata. The I/O scheduler 910 receives a second I/O request 940 for an initial block of the prioritized content. The optimization causes the I/O scheduler 910 to forward the second I/O request 940 along with additional requests for subsequent blocks 950 and 960 of the prioritized request to the storage medium 920 in advance of those subsequent blocks being requested by users or applications of the user system. The subsequent blocks are cached. As shown, subsequent requests for those blocks are satisfied from cache without the round trip delay to the storage medium 920.

Different configurable settings for the I/O scheduler can also optimize writing of large size content. The modeling can identify that the primary usage scenario I/O pattern involves a large amount of sequential writes. In such cases, the configurable settings for the I/O scheduler can be set to queue or buffer multiple write requests directed to the same content so that a single large sequential write request can be issued to the storage medium rather than multiple write requests. For instance, the single large sequential write request can specify writing 512 kilobytes (KBs) of sequential data in place of four separate write requests of 128 KBs. The single sequential write request optimizes writing performance because the single sequential write request can be performed in one rotation of mechanical disk, whereas the four separate write request may require one rotation of the mechanical disk to perform each of the four write requests. In some such embodiments, the recordsize or volblocksize configurable settings of the OpenZFS file system can be modified to achieve the large sequential write.

Kernel configurable settings can also optimize reading and writing of large size content. The Illlumos kernel provides for configurable physical block sizes. Some embodiments modify the block ashift property of OpenZFS to force a minimum block and modify the max recordsize to force a maximum block size while allowing for a variable block to happen as well. When the modeling identifies a disproportionate number of large file size I/O requests in the primary usage scenario I/O pattern, the physical block size can be increased so that files can be read or written with fewer requests than with a smaller physical block size. For example, a file can be written to disk with half the number of write operations when using 8 KB sectors instead of 4 KB sectors.

It should be reiterated that the modeling and resulting modifications to the user system involve modifying several of the above described and other configurable settings in concert. Thus, the modifications and optimizations involve two or more settings being changed from default or system defined value to custom values that realize the optimal storage performance for a given user system under a primary usage I/O pattern.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 10:
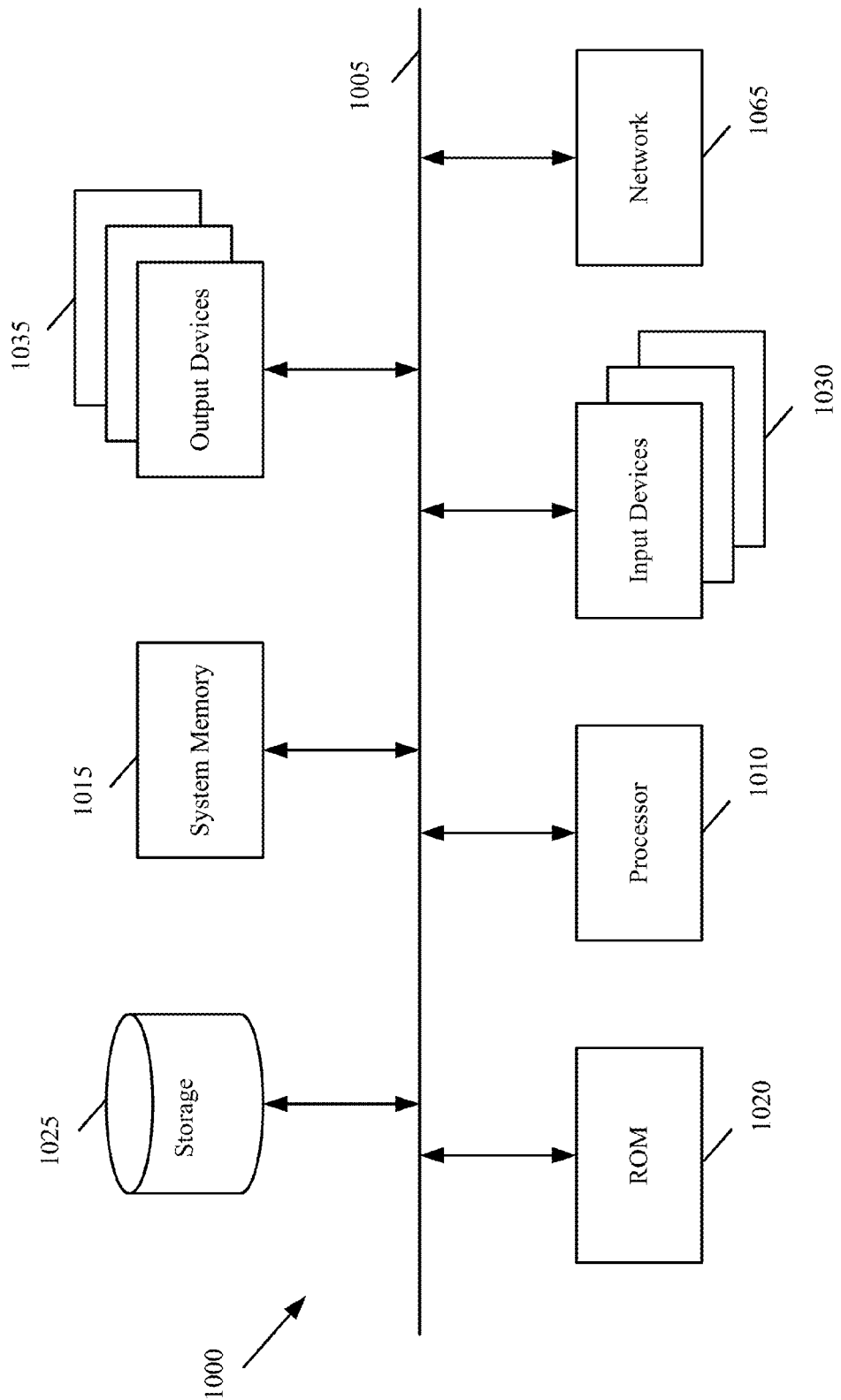
FIG. 10 illustrates a computer system or server with which some embodiments are implemented.

FIG. 10 illustrates a computer system or server with which some embodiments are implemented. Such a computer system includes various types of computer-readable mediums and interfaces for various other types of computer-readable mediums that implement the various methods and machines described above (e.g., distributed platform server or origin server). Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device Like the permanent storage device 1025, the system memory 1015 is a read-and-write memory device. However, unlike storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keypads (including physical keyboards and touchscreen keyboards), pointing devices. The output devices 1035 display images generated by the computer system. The output devices include printers and display devices, such as cathode ray tubes (CRT) or liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for optimizing storage performance of a computer system for a subset of a plurality of applications running on said computer system, the method comprising:
   generating a plurality of probabilistic hashes representing an input/output (I/O) pattern accessing at least one physical storage medium of the computer system, the I/O pattern comprising a first ordering of a plurality of read and write storage operations;
   isolating a probabilistic hash pattern from results of a subset of the plurality of probabilistic hashes, the results from the subset of probabilistic hashes representing a first subset of the plurality of read and write storage operations that are issued with a higher frequency than a different second subset of the plurality of read and write storage operations, wherein the first subset of read and write storage operations is a primary I/O sub-pattern and the second subset of read and write storage operations is a secondary I/O sub-pattern;
   generating a tensor equation modeling storage performance of the at least one physical storage medium based on the primary I/O sub-pattern, the tensor equation comprising at least one tensor as a multidimensional matrix with different variables corresponding to a plurality of configurable settings controlling storage operation behavior of the at least one physical storage medium;
   solving for the at least one tensor using the probabilistic hash pattern representing the primary I/O sub-pattern as input;
      obtaining a particular set of values for the plurality of configurable settings as output from said solving for the at least one tensor, the particular set of values reordering execution of the plurality of read and write storage operations for execution by the at least one physical storage medium from said first ordering to a different second ordering, wherein the second ordering accelerates storage performance of the at least one physical storage medium for the primary I/O sub-pattern over the secondary I/O sub-pattern;
   modifying read and write storage operation behavior of the at least one physical storage medium, wherein said modifying comprises reordering execution of subsequent read and write storage operations performed by the at least one physical storage medium according to the particular set of values, wherein said reordering increases storage performance provided to the primary I/O sub-pattern over the secondary I/O sub-pattern and the subset of applications over other applications of the plurality of applications running on the computer system with hardware resources of the computer system remaining unchanged.

2. The method of claim 1, wherein said I/O pattern is generated in response to a plurality of I/O requests issued from one or more of the plurality of applications running on the computer system.

3. The method of claim 2 further comprising inserting a plurality of probes within the computer system.

4. The method of claim 3, wherein the plurality of probes track the I/O pattern issued from the plurality of applications.

5. The method of claim 1, wherein the plurality of configurable settings comprises adjustable kernel, operating system, file system, and the at least one physical storage medium settings.

6. The method of claim 1 further comprising receiving a list of a first set of applications running on the computer system.

7. The method of claim 6 further comprising selecting the I/O pattern from a plurality of I/O patterns, wherein the I/O pattern is generated from a different computer system executing a second set of applications comprising at least one application in the first set of applications.

8. A method comprising:
  probing two or more of a computer system operating system, kernel, file system, and storage device;
  tracking based on said probing, a plurality of storage operations issued from a plurality of software applications running on said computer system to said two or more of the computer system operating system, kernel, file system, and storage device;
    establishing baseline storage performance based on execution latency of each operation from the plurality of storage operations;
  separating a primary usage I/O pattern and a secondary usage I/O pattern from the plurality of storage operations based on identification of each storage operation of the plurality of storage operations as a read or a write, said execution latency, and data size of each operation of the plurality of operations;
    generating a tensor equation modeling storage operation execution of the computer system, the tensor equation comprising at least a first multidimensional matrix comprising values representing the primary usage I/O pattern, and a second multidimensional matrix with different variables corresponding to a plurality of configurable settings controlling storage behavior of the computer system;
    solving said tensor equation using the first multidimensional matrix and the second multidimensional matrix as parameters that exclude usage of the secondary usage I/O pattern, wherein said solving of the tensor equation directly produces one output with a plurality of optimal values, the plurality of optimal values comprising an optimal value for each configurable setting of the plurality of configurable settings;
    adapting storage behavior of each particular configurable setting of the plurality of configurable settings with an optimal value from the plurality of optimal values produced for the particular configurable setting as a result of said solving, wherein said adapting comprises reordering execution of subsequent storage operations according to the plurality of optimal values being applied to the plurality of configurable settings, wherein said reordering increases storage performance provided to the primary usage I/O pattern over the secondary usage I/O sub-pattern, and a subset of applications producing the primary usage I/O pattern over other applications of the plurality of applications running on the computer system with hardware resources of the computer system remaining unchanged.

9. The method of claim 8, wherein said adapting further comprises reconfiguring two or more of the computer system operating system, kernel, file system, and storage device with the plurality of optimal values.

10. The method of claim 9, wherein said reconfiguring comprises changing a default value configured for a particular configurable setting of the plurality of configurable settings with an optimal value from the plurality of optimal values.

11. The method of claim 8 further comprising prioritizing execution of a common first write storage operation associated with a first content type that is issued by a first application over an uncommon different second write storage operation associated with a different second content type that is issued by another application, wherein said prioritizing comprises modifying an I/O scheduler configurable setting from the plurality of configurable settings with an optimal value from the plurality of optimal values.

12. The method of claim 8 further comprising reordering execution of write storage operations issued from a first application before other write and read storage operations as a result of modifying an I/O scheduler configurable setting from the plurality of configurable settings with an optimal value from the plurality of optimal values.

13. The method of claim 8 further comprising switching in response to said adapting, between most frequently used caching and most recently used caching as a result of modifying a cache scheduler configurable setting from the plurality of configurable settings with an optimal value from the plurality of optimal values.

14. The method of claim 8 further comprising changing a block size with which the storage device reads and writes data in response to said adapting and the primary usage I/O pattern comprising a majority of large size content writes or a majority of sequential write operations.

15. The method of claim 8 further comprising prepopulating cache with read aheads in response to said adapting and the primary usage I/O pattern comprising sequential reads.

16. The method of claim 8, wherein said adapting further comprises scaling an amount of kernel memory cache or main memory cache based on the primary usage I/O pattern, and modifying a configurable setting from the plurality of configurable settings with an optimal value from the plurality of optimal values.

17. A method for maximizing storage performance of at least one physical storage device in a computer system, the method comprising:
  selecting at least one specific application from a plurality of applications running on the computer system in response to the at least one specific application having greater utilization of the at least one physical storage device than other applications of the plurality of applications;
  generating a plurality of probabilistic hashes representing storage operations produced by the plurality of applications;
  selectively isolating results from a set of the plurality of probabilistic hashes, wherein results from the plurality of probabilistic hashes are representative of an I/O pattern of the computer system, and the results of the set of probabilistic hashes are representative of an I/O sub-pattern of the at least one specific application that is intermixed and extracted from the I/O pattern of the computer system;
  generating a tensor equation modeling storage performance of the at least one physical storage device, the tensor equation comprising a tensor with different variables corresponding to configurable settings of one or more of the computer system operating system, kernel, file system, and the at least one physical storage device; and
  solving for the tensor using the I/O sub-pattern as input;
  modifying storage operation behavior of the at least one physical storage medium by changing default values of the configurable settings of two or more of the computer system operating system, kernel, file system, and the at least one physical storage device firmware to custom values based on output from said solving, wherein said modifying comprises reordering execution of subsequent storage operations performed by the at least one physical storage device according to the custom values, wherein said reordering improves storage operation execution performance provided by the at least one physical storage device to the at least one specific application over the other applications of the plurality of applications with hardware resources of the computer system remaining unchanged, and improves performance of the I/O sub-pattern over other storage operations from the plurality of storage operations.

18. The method of claim 17, wherein said modifying further comprises changing execution ordering of the plurality of storage operations from a default ordering produced by the default values to a modified ordering produced by the custom values.

19. The method of claim 17, wherein said modifying further comprises increasing or decreasing a size of a read or write buffer from a default first size configured by the default values to a custom second size configured by the custom values.

20. The method of claim 1, wherein said solving comprising generating one or more matrices based on the probabilistic hash pattern representing the primary I/O sub-pattern, and producing the particular set of values from output of a function accepting the one or more matrices and the at least one tensor as parameters.

\* \* \* \* \*